Figure 1:
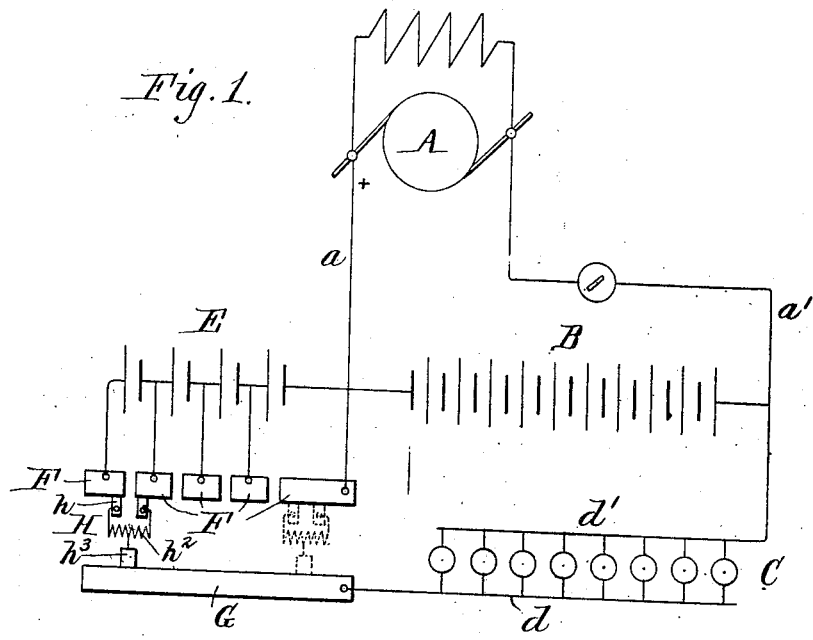

W. A. TURBAYNE.
SYSTEM OF ELECTRICAL DISTRIBUTION.
APPLICATION FILED OCT. 30, 1903.

919,267.

Patented Apr. 20, 1909.

Witnesses:
E. A. Volk
R. W. Rimur

W. A. Turbayne Inventor.
By Wilhelm Bonner
Attorneys.

UNITED STATES PATENT OFFICE.

WILLIAM A. TURBAYNE, OF LANCASTER, NEW YORK, ASSIGNOR TO CHARLES M. GOULD, OF NEW YORK, N. Y.

SYSTEM OF ELECTRICAL DISTRIBUTION.

No. 919,267.  Specification of Letters Patent.  Patented April 20, 1909.

Application filed October 30, 1903. Serial No. 179,145.

*To all whom it may concern:*

Be it known that I, WILLIAM A. TUR-BAYNE, a citizen of the United States, residing at Lancaster, in the county of Erie and State of New York, have invented new and useful Improvements in Systems of Electrical Distribution, of which the following is a specification.

This invention relates to systems of electrical distribution wherein the supply voltage is subject to variations, and the electro-motive-force impressed across the translating devices in the work circuit is regulated by introducing and withdrawing counter electromotive-force to and from the system as the voltage of the supply circuit increases and decreases.

The object of the invention is to provide such a system with means whereby the electro-motive-force across the translating devices is maintained at a practically constant value, notwithstanding variations in the source of supply, while the increment and decrement of the counter electro-motive-force added to or withdrawn from the work circuit will be of small value, and the change of voltage in the work circuit occasioned thereby will not be easily detected in the translating devices.

The invention is hereinafter described and shown in the drawings, by way of example, in connection with an incandescent electric lighting system involving the use of a storage battery, it being known that the electro-motive-force across the battery varies over comparatively wide limits in accordance with the condition of charge and discharge, rising while charging and falling upon discharge. The improvements are not however limited in their application to such a system.

Figure 2:
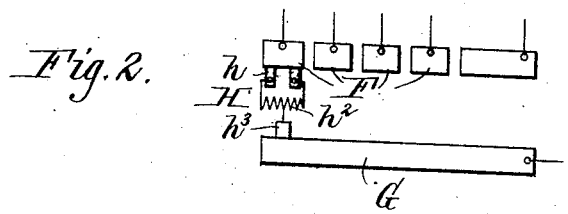
Figure 3:
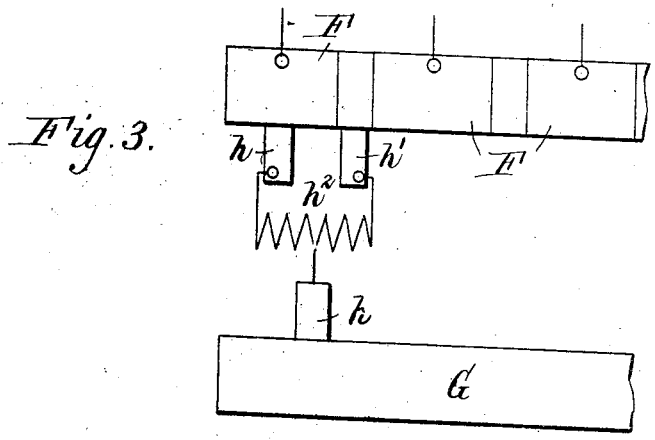

In the accompanying drawings: Figure 1 is a diagrammatic view of an electric lighting system embodying the invention, showing by full and dotted lines different positions of the regulating contact device. Fig. 2 is a fragmentary diagrammatic view showing another portion of the regulating contact device. Fig. 3 is a fragmentary diagrammatic view on an enlarged scale, showing the position of the regulating contact device while in transit from one to the other of the counter cell contacts.

Like letters of reference refer to like parts in the several figures.

A represents a dynamo of any suitable construction, B an ordinary storage battery or batteries connected across the terminals of the dynamo by conductors $a$ $a'$, and C translating devices in this instance representing incandescent lamps connected in parallel across the two sides $d$ $d'$ of the work circuit. One side $d'$ of the work circuit is connected directly to one terminal of the battery and dynamo, while the other side $d$ thereof is connected indirectly to the other terminal of the battery and dynamo through the regulating device as follows:

E represents a series of counter electro-motive-force cells connected in series with the terminal $a$ of the dynamo, and F a series of insulated contact pieces which are connected to the end terminals and junctions of the counter electro-motive-force cells.

G is a conductor electrically connected to the other side $d$ of the work circuit and preferably in the form of a contact strip arranged in parallel relation to the series of counter cell contact pieces F.

A regulating contact device H is adapted to electrically connect the conductor G with either of the counter cell contact pieces F to complete the work circuit through one or more of the counter electro-motive-force cells or independently thereof. The regulating contact device is preferably movable relative to the counter cell contacts and conductor G, and can be moved manually, or preferably, automatically by any of the well known means known to the art for this purpose. When the regulating contact device is in electrical connection with the outermost counter cell contact piece F, as shown in Fig. 2, the electric current of the work circuit traverses all of the counter electro-motive-force cells, whereas all or a part of the counter electro-motive force cells are cut out of the work circuit accordingly as the regulating contact device connects with the innermost counter cell contact piece F, as shown by dotted lines in Fig. 1, or one of the intermediate counter cell contact pieces.

As each counter cell when charged has an electro-motive-force of approximately two volts, the change of voltage in the work circuit would be plainly discernible in the translating devices especially where incandescent lamps are employed, if the full voltage of a counter electro-motive-force cell was suddenly withdrawn from the work circuit. To avoid such a perceptible change of voltage in the work circuit and also to prevent a sudden discharge of a counter electromotive-force cell, and consequent injury of the contact pieces by connecting the terminals of the counter cell with a contact of low resistance, the connection between the conductor G and counter cell contacts is effected as follows: The regulating contact device, see Fig. 3, comprises two contact pieces $h$ $h'$ of conducting material which are connected by a resistance material $h^2$ and are spaced apart far enough to connect two of the counter cell contact pieces F through the resistance $h^2$, while each contact piece $h$ $h'$ is narrower than the insulating space or material between the counter cell contacts F, so that they cannot in any position of the regulating contact device, bridge two of said contacts and short circuit the counter electro-motive-force cell connected thereto. The regulating contact device is, in all positions thereof, in electrical connection with the conductor G, preferably by means of a third contact piece $h^3$ which makes sliding contact with the conductor G, and is preferably connected to the central point of the resistance $h^2$.

The operation of the system is as follows: The normal voltage across the work circuit and translating devices should be the voltage of the battery upon discharge, and the voltage across the work circuit should be maintained at this value notwithstanding changes in the supply voltage. Assuming the battery to be connected to the work circuit but disconnected from the source of initial supply, i. e. the dynamo A, the regulating contact device H will connect the innermost of the counter cell contacts F and the conductor G as indicated by dotted lines in Fig. 1. In this position of the regulating contact device the translating devices are connected directly across the battery and the current flows from the positive terminal of the battery through said counter cell contact F, regulating contact device H, conductor G, translating devices C back to the negative terminal of the battery. As the working current traverses both halves of the resistance $h^2$ of the regulating contact device in parallel, the resistance to the flow of the current is negligible, and the normal electro-motive-force will be impressed across the translating devices. If now the initial source of supply is connected to the battery for charging the same the electro-motive-force across the battery will rise and continue to rise during the charging process until it reaches a value considerably greater than the normal value during discharging. As the charging proceeds the regulating contact device is shifted in a direction to successively insert into the working circuit sufficient of the counter electro-motive-force cells to counteract this increased voltage which would otherwise be impressed across the translating devices, irrespective of the number thereof in operation in the work circuit. The electro-motive-force across the terminals of the counter electro-motive-force cells does not rise instantly to its full value, as the cells are inserted into the work circuit, but builds up gradually, and the effect thereof upon the translating devices is not noticed. When the battery is fully charged and its electro-motive-force is at its highest value it is assumed that all of the counter electro-motive-force cells will be interposed in the work circuit and the regulating contact device in position to connect the outermost counter cell contact F and conductor G, as indicated in Fig. 2. The current through the translating devices then traverses all of the counter electro-motive-force cells, which thus attain a charged condition. If the electro-motive-force of the work circuit diminishes on account of a diminution of the electro-motive-force of the charging source, or for any other reason, the regulating contact device operates to withdraw a sufficient number of the counter electro-motive-force cells to restore the electro-motive-force of the work circuit to the normal. As the contact pieces $h$ $h'$ of the regulating contact device are narrower than the insulating spaces or material between the counter cell contact pieces F, as before explained, the former cannot bridge two adjacent counter cell contact pieces and absolutely short-circuit the counter electro-motive-force cells to which they are connected, but the counter cells must discharge through the resistance $h^2$ of the regulating contact device and the current thus opposed will not reach sufficient magnitude to endanger the contacts. As the regulating contact device moves from one counter cell contact F to the other, its contact pieces $h$ $h'$ connect the counter cell contact pieces F connected to opposite terminals of a counter electro-motive-force cell and the latter will discharge through the resistance $h^2$ of the regulating contact device, the local current being thereby limited to a definite predetermined value which will not be sufficient to endanger the contacts. There will be a regular local fall of potential throughout the resistance $h^2$ of the regulating contact device, and when the latter is operated to bridge any two of the contacts F connected to opposite terminals of a counter electro-motive-force cell, as indicated in Fig. 1, as the contact piece $h^3$ thereof is connected centrally with the resistance, only half of the full voltage of the counter cell will be withdrawn from the work circuit, and the full voltage thereof will not be withdrawn until both terminals of the resistance $h^2$ are placed in connection with one of the contact pieces F, as indicated in Fig. 2. Thus the change of voltage in the work circuit at any one time is only equal to half the value of the full voltage of the coun-

I claim as my invention:

1. In a system of electrical distribution, the combination of a work circuit, a variable source of current supply therefor, and means for regulating the voltage of the work circuit, comprising counter-electromotive-force cells connected to said supply source, and a resistance connected at an intermediate point with said work circuit and having terminals which in one position connect the opposite terminals of one of said counter-electromotive-force cells and in another position both connect at the same time with the opposite terminals of two of said counter-electromotive-force cells, whereby the drop of voltage in the work circuit when a counter-electromotive-force cell is cut out of the circuit will be less than the voltage of such cell, substantially as set forth.

2. In a system of electrical distribution, the combination with a circuit and a source of current supply therefor, of generators of counter-electromotive-force, and means for cutting units of counter-electromotive-force into and out of said circuit to regulate the voltage thereof, comprising insulated contacts each connected to the opposite terminals of two of said counter-electromotive-force generators, and a contact device having two contact pieces at opposite terminals of a resistance medium which is connected between its terminals with said circuit, said contact pieces of said contact device connecting at one time with the same insulated contact and at another time connecting two adjacent insulated contacts together but only through said resistance medium, substantially as set forth.

3. In a system of electrical distribution, the combination with a work circuit, and a variable source of current supply therefor, of means for regulating the voltage of said circuit comprising counter-electromotive-force cells connected in series to one side of said circuit and having insulated terminal contacts, a contact bar arranged opposite to said terminal contacts and connected with the other side to said circuit, and a movable contact device for successively cutting said counter-electromotive-force cells into and out of said circuit provided with a pair of contact pieces connected by a resistance medium and adapted to contact with said terminal contacts and a third contact piece connected with the intermediate portion of said resistance medium and engaging said contact bar, said pair of contact pieces in one position of said contact device connecting opposite ends of said resistance to the same terminal contact and in another position of said contact device connecting two adjacent terminal contacts but only through said resistance medium, substantially as set forth.

4. In a system of electrical distribution, the combination of a work circuit, a variable source of current supply therefor, and means for regulating the voltage of the work circuit, comprising counter-electro-motive-force cells connected in series to one side of said work circuit and having insulated terminal contacts, and a contact device for successively cutting said counter-electro-motive-force cells into and out of said work circuit provided with a resistance medium connected between its ends to the other side of said work circuit and provided with two contact pieces at its ends adapted to contact with said terminal contacts, said end contact pieces being of less width than the space between adjacent terminal contacts and being spaced apart a distance less than the width of one terminal contact, whereby they can simultaneously engage the same terminal contact but can only connect two adjacent terminal contacts through said resistance, substantially as set forth.

Witness my hand this 19th day of October, 1903.

WILLIAM A. TURBAYNE.

Witnesses:
CHAS. W. PARKER,
C. M. BENTLEY.